July 26, 1960 R. L. PICKHOLTZ ET AL 2,946,845

GAIN CONTROL OF DEMODULATION WAVES

Filed Dec. 20, 1956 2 Sheets-Sheet 1

INVENTORS
RAYMOND L. PICKHOLTZ &
ALBERT MACOVSKI
BY [signature]
ATTORNEY

July 26, 1960 R. L. PICKHOLTZ ET AL 2,946,845

GAIN CONTROL OF DEMODULATION WAVES

Filed Dec. 20, 1956 2 Sheets-Sheet 2

INVENTORS
RAYMOND L. PICKHOLTZ &
ALBERT MACOVSKI
BY
[signature]
ATTORNEY 2,946,845

GAIN CONTROL OF DEMODULATION WAVES

Raymond L. Pickholtz, New York, and Albert Macovski, Masapequa, N.Y., assignors to Radio Corporation of America, a corporation of Delaware Filed Dec. 20, 1956, Ser. No. 629,651

8 Claims. (Cl. 178—5.4)

The present invention relates to improved circuits for reducing dot structure reproduction and for color killer action in color television receivers where the color information is processed in the kinescope.

The color television signal conforming to the modern standards includes a luminance signal and a chrominance signal. The chrominance signal, hereinafter referred to as chroma, is a modulated subcarrier signal having a frequency of 3.58 mcs. and which includes modulations representative of a plurality of color difference signals. The color television signal may be converted to any of a plurality of component color signals such as component color signals relating to, say, the red, green and blue content of a televised image, by heterodyning the color television signal with a demodulating signal having the frequency of the modulated subcarrier and having a phase of the color subcarrier related to the component color signal to be produced. In order that accurately phased demodulating signals may be produced in a circuit remote from a transmitter, color synchronizing bursts having a reference phase are transmitted during each picture retrace interval.

The color television signal may be processed within the color kinescope by modulating each electron beam of the color kinescope with the color television signal, and by introducing demodulating signal modulation having the frequency of the modulated subcarrier and a prescribed phase of the chrominance signal into each electron beam. The component color signals corresponding to the phases of the demodulating signals are produced as modulations in the respective electron beams so that the impinging of the modulated electron beams on selected areas of phosphors on a target area of the color kinescope will reproduce the televised color image.

In color television receivers, wherein the color television signal is processed in the color kinescope in the manner described above, signal components in the color television signal having frequencies in the vicinity of the frequency of the subcarrier of the chrominance signal may cause visible dot structure to be reproduced on the target area of the color kinescope. This dot structure will be particularly objectionable in color areas of low saturation of the reproduced image. During the reception of a television signal conveying only monochrome image information, it is also highly desirable that "color killer" action in the kinescope processing system be employed; that the color kinescope processing system is prevented from demodulating brightness information and noise in the vicinity of the frequency normally occupied by the subcarrier of the chrominance signal during color television transmission. If the latter is not accomplished, spurious color information may be reproduced by the color kinescope.

It is therefore an object of the invention for providing a kinescope color processing system wherein a received color television signal is processed in the color kinescope and reproduced thereby with a minimum of dot structure; and wherein during the reception of a television signal representing a monochrome image, a minimum amount of spurious color information, representing information components present in the television signal in the vicinity of the frequency range normally occupied by a chrominance signal is provided in a reproduced image.

It is another object of the invention to provide an improved means for color killer action in a color television receiver wherein the color television signal is processed within the color kinescope.

It is therefore an object of the invention to provide means for minimizing objectionable dot structure in images reproduced by color television receivers wherein the color television signal is processed within the color kinescope.

According to the invention, dot structure in a color television image reproducing circuit wherein the color image information is processed in the color kinescope, may be reduced by dynamically varying the amplitude of the demodulating signals applied to the color kinescope according to the saturation of the color information in a received color television signal.

In one form of the invention where the color television signal is applied to the cathodes of a color kinescope and properly phased demodulating signals to its control grids, the envelope of the chrominance signal or chroma is detected and the detected signal is used to control the amplitude level of the demodulating signals applied to the control grids whereby in areas of low saturation of the televised image, the amplitude of the demodulating signals is reduced. The benefits of the above may be appreciated by understanding that demodulating signal voltages which are greater than a minimum required for a given saturation serve no purpose other than causing a dot structure accentuation and defocusing due to large peak kinescope currents.

The present invention may be optimally employed to produce color killer action, that is, to prevent the demodulation of color information in the chrominance signal range of a received television signal when that received television signal is representative only of a monochrome image. Color killer action is provided by reducing the amplitudes of the demodulating signals, which are applied to the control grids, to substantially zero when the transmission is not that of a color image.

Other and incidental objects of the invention will become apparent upon a reading of the specification and a study of the figures wherein.

Figure 1:
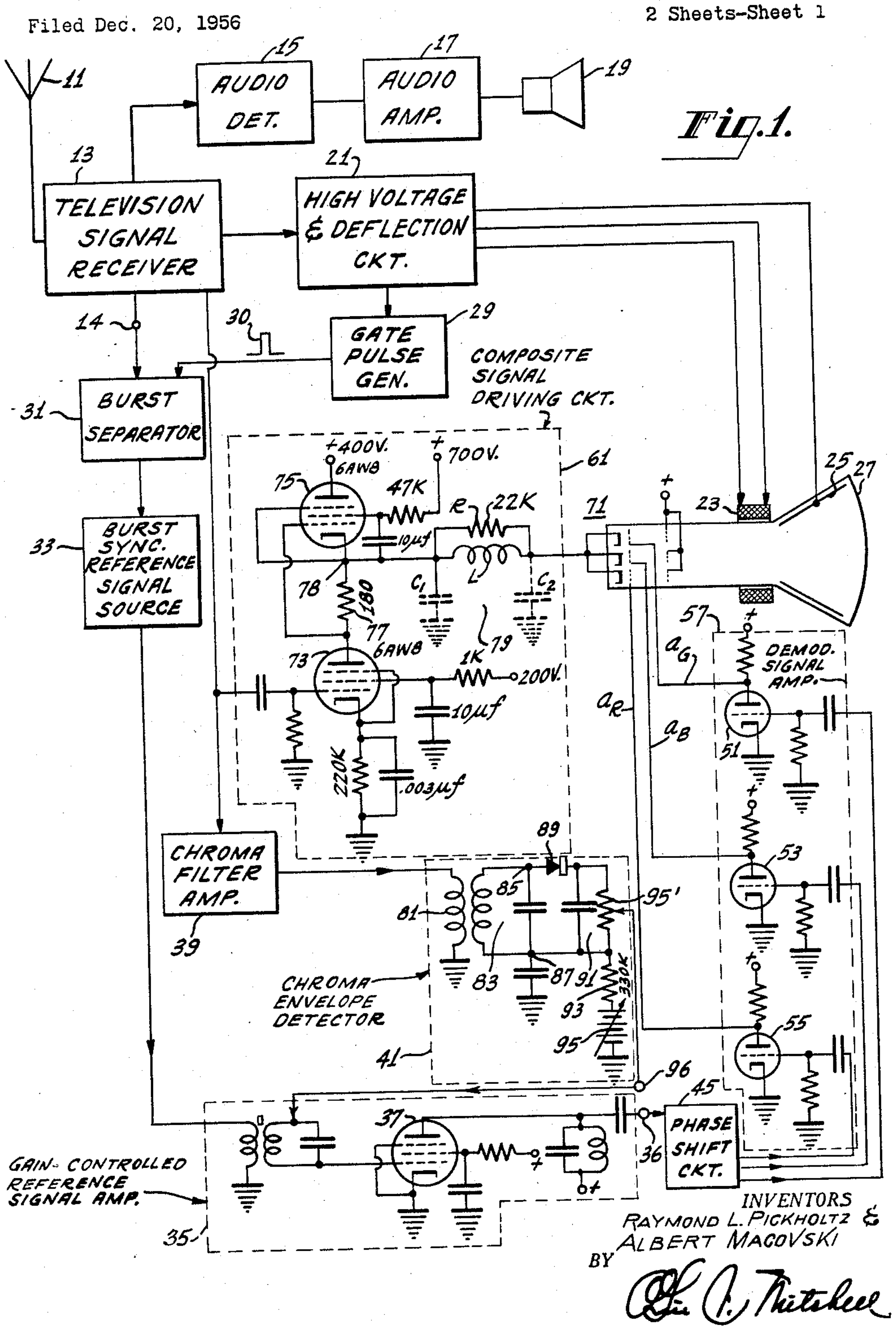
Figure 1 is a diagram of a color television receiver including circuits for providing a minimizing of dot structure according to the present invention.

The general operation of the color television receiver of Figure 1 is described first. The circuits of the present invention, as used in the circuit of Figure 1 will be described in detail following this description.

The incoming signal from a broadcasting station is received at the antenna 11 and applied to the television signal receiver 13. The television signal receiver 13 demodulates the television signal from the incoming signal. If the incoming signal is produced during color transmission, the color television signal demodulated therefrom includes not only the luminance and the chrominance signal, but also picture deflection synchronizing signals, color synchronizing bursts which convey reference phase information related to the phases of the chrominance signal, and also a sound modulated frequency modulated carrier which is transmitted 4½ mcs. removed from the picture carrier.

The sound information is demodulated in the audio detector 15, amplified in the audio amplifier 17, and applied to the loud speaker 19.

The color television signal is applied to the high voltage and deflection circuit 21, which separates the picture deflection synchronizing signals from the color television signal. The high voltage and deflection circuit 21 develops from these picture deflection synchronizing signals, both vertical and horizontal deflection signals which are applied to the deflection yokes 23; the high voltage and deflection circuit 21 also develops a high voltage which is applied to the ultor 25 (second anode) of the color kinescope 27. In addition, the high voltage and deflection circuit 21, responsive to the horizonal synchronizing pulses of the picture deflection synchronizing signals, energizes the gate pulse generator 29 which produces a gate pulse 30 having a duration interval equal to and in time coincidence with the color synchronizing bursts which are transmitted on the "back porch" of the horizontal synchronizing pulses. The gate pulse generator 29 may be included in the color television receiver in the form of an auxiliary winding on a high voltage transformer of the high voltage and deflection circuit 21, or in the form of a multivibrator which is responsive to the horizontal synchronizing pulses.

The color television signals are applied to the burst separator 31 by way of terminal 14. The burst separator 31, responsive to the gate pulse 30, gates or separates the color synchronizing bursts from the color television signal. The separated color synchronizing bursts are thereupon applied to the burst synchronized reference signal source 33.

The burst synchronized reference signal source 33 is a signal generator circuit which is capable of producing a signal which is accurately synchronized in phase to a phase prescribed by the color synchronizing bursts. The burst synchronized reference signal source 33 may be an injection-locked oscillator, or a burst-driven ringing circuit, or an automatic frequency controlled oscillator which uses a reactance tube for frequency control and which employs a phase discriminator for comparing the burst and the output of the oscillator and for deriving therefrom a control voltage which is used to control the reactance tube.

The output of the burst synchronized reference signal source 33 is a burst synchronized reference signal which is applied to the gain controlled reference signal amplifier 35. The gain controlled reference signal amplifier is a circuit capable of controlling the amplitude of the reference signal according to the magnitude of a bias voltage applied to the control grid of a tube 37.

The color television signal from the television signal receiver 13 is applied to the chroma filter and amplifier 39 which has a pass band in a range between 2 to 4.2 mcs. The components of the color television signal, lying in this frequency range and filtered from the color television signal by the chroma filter and amplifier 39, constitutes the chrominance signal or chroma. The amplitude of the envelope of the chrominance signal provides an indication of the saturation of the color image represented by the color television signal.

The chroma is thereupon applied to the chroma envelope detector 41, which detects the envelope of the chroma and derives a control signal whose amplitude is proportional to this envelope; the control signal is applied by way of terminal 96 to the control grid of the tube 37 of the gain controlled reference signal amplifier 35, to cause the amplitude level of the reference signal to be a function of the amplitude of the envelope of the chroma in accordance with the invention.

The gain controlled reference signal, as provided by the gain controlled reference signal amplifier 35, is applied by way of terminal 36 to the phase shift circuit 45 which develops a trio of reference signals having different phases. The trio of reference signals are demodulating signals which are amplified in the tubes 51, 53 and 55 of the demodulating signal amplifier 57 and applied therefrom to the control grids of the color kinescope 27.

The color television signal, also termed the composite signal, is applied to the composite signal driving circuit 61 which amplifies the composite signal and applies this composite signal to all of the cathodes of the color kinescope 27.

The composite signal driving circuit 61 functions as a constant-current high-impedance source of the composite color television signal, and applies a current representative of the composite color television signal to the cathodes 71 of the electron guns of the color kinescope 27. As a result of the use of a constant-current type of source, the electron guns will differentially share the total current from the circuit 61 depending on the phase and amplitude of the chroma in the composite signal; that is, although the beam current from each electron gun will be dependent upon the instantaneous amplitude of the demodulating signal applied to the control grid of that electron gun and will differ from the beam current produced by the other electron guns, the total kinescope current will be fixed for each value of the composite signal as provided by the composite signal driving circuit 61 to the cathodes of the color kinescope 27. This is due to the fact that the current supplied by the constant-current composite signal driving circuit 61 to the cathodes 71, is a function of only the instantaneous value of the composite signal and the internal impedance of the driving circuit, and not of the impedance presented to the driving circuit 61 by the cathode circuit of the color kinescope 27.

Figures 2, 3:
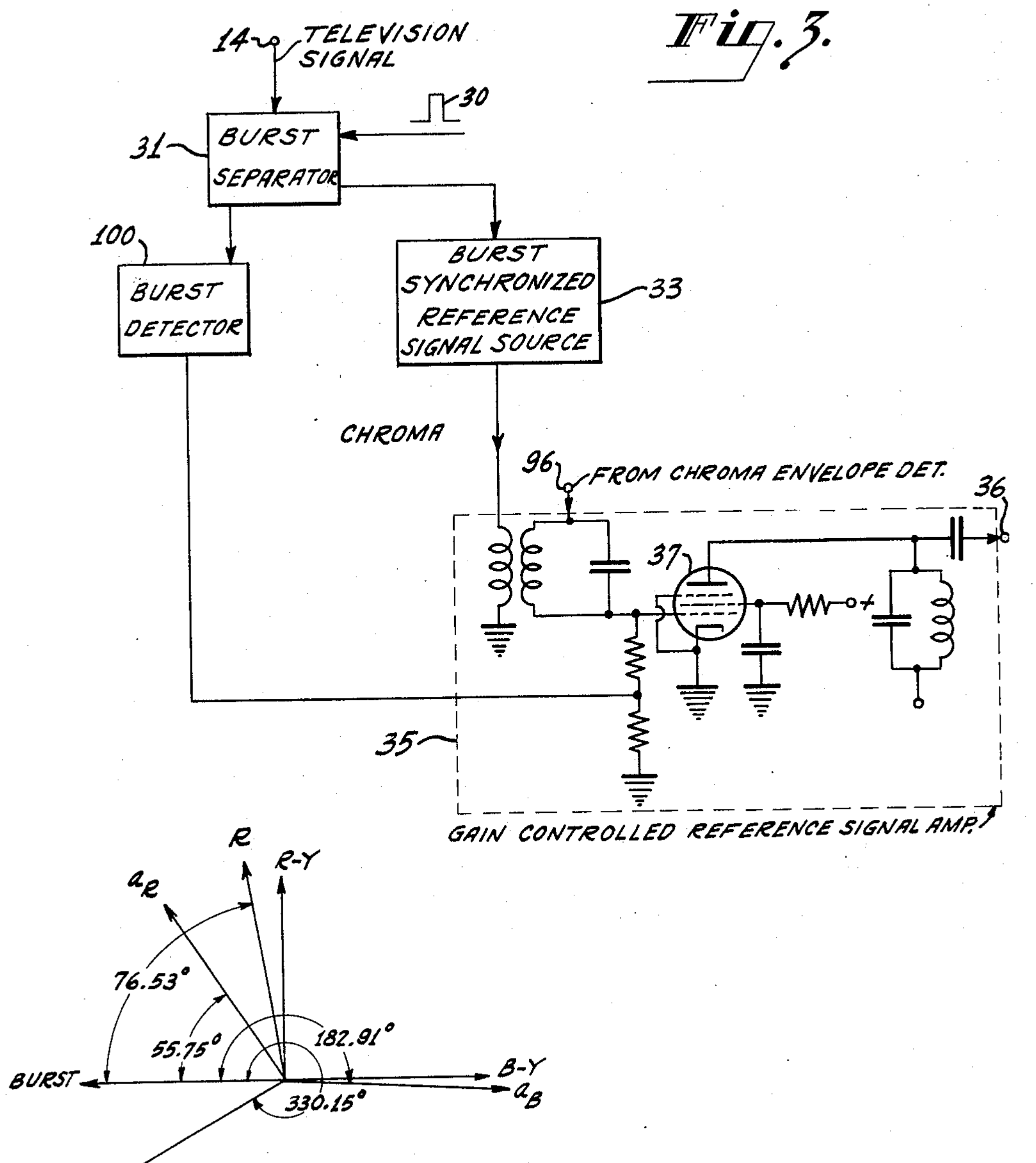
Figure 2 is a vector diagram of relative phase angles between pertinent color information in the chrominance signal.
Figure 3 is a block diagram of a burst-controlled color killer of the present invention.

The demodulating signal amplifier 57 amplifies to a trio of demodulating signals, each having a phase corresponding to one of the vectors $a_R$, $a_B$ and $a_G$ of Figure 2 to the corresponding control grids of the electron guns of the color kinescope 27. As is seen from Figure 2 the vectors $a_R$, $a_B$ and $a_G$ have phases which lag the burst phase by 55.75°, 182.91° and 330.15°, respectively. These angles are chosen to cause the electron gun, to which the demodulating signal having the phase of the vector $a_R$ is applied, to develop a fully saturated red component color signal in the electron beam issuing from that gun, and to cause the electron beams issuing from the electron guns to which the demodulating signals having the phases corresponding to the vectors $a_B$ and $a_G$ are applied, to develop fully saturated blue and green component color signals, respectively.

The angles described above are chosen whereby component color signals representative of exact hues representative of the televised image are produced in the respective electron beams. Trios of demodulating signals having other combinations of phases, such as a trio of demodulating signals having phases including burst phase and phases 120° removed from burst phase, will also produce a reproduced color image of high fidelity.

The operation of the circuits whose schematic diagrams are included in the boxes identified as the composite signal driving circuit 61, the chroma envelope detector 41, the gain controlled reference signal amplifier 35 and the demodulating signal amplifier 57 of Figure 1 is described as follows. These circuits are representative circuits, though not definitive circuits, for causing the color television receiver of Figure 2 to operate according to the present invention.

The composite signal driving circuit 61 is a circuit for presenting the composite color television signal, including the luminance and the chrominance signal, to the cathodes 71 of the color kinescope 27. The composite signal driving circuit 61 is especially designed to act as a constant-current high-impedance source of the composite signal for the cathodes 71. By functioning as a constant current source of the composite signal, the composite signal driving circuit 61 provides operation whereby variations of the demodulator signal voltages applied to the control grids of the color kinescope 27 cannot cause a change of reproduced luminance, since changes in luminance can only be caused by a change of total electron gun current; this change is not possible because of the "constant current" nature of the composite signal driving circuit 61. The total current for any value of image information represented by the composite signal, will therefore be maintained constant to the electron guns of the color kinescope 27.

The composite signal driving circuit 61 includes a pentode 73 to whose control grid the composite signal is applied. The anode circuit of the pentode 73 includes the pentode 75, to whose cathode the anode of pentode 73 is coupled by way of resistor 77. The anode of the pentode 73 is coupled to the control grid of pentode 75 for reasons to be presently described in detail.

The arrangement including the pentodes 73 and 75 form a constant current type of source of the color television signal, employing the pentode 75 as the plate circuit for the pentode 73 to thereby enhance the constant current qualities of the circuit. The composite color television signal as applied to the control grid of pentode 73 and developed therefrom across resistor 77 and the pentode 75 is, in effect, coupled in the form of a current to the cathodes 71 from the terminal 78 at the cathode of pentode 75. In practice, the resistor 77 has a substantially small value, in the vicinity of 180 ohms when used with a pair of 6AW8 pentodes comprising pentodes 73 and 75. By proportioning the resistor 77 so that its magnitude is approximately equal to the reciprocal of the transconductance of the pentode 75, the current through pentode 75 to the terminal 78 and to the cathodes 71 will vary inversely as the current developed in the pentode 73 responsive to the color television signal applied to the latter named pentode and applied therefrom by way of terminal 78 to the cathodes 71.

The arrangement of pentodes 73 and 75 as shown in Figure 1 provides the additional function of yielding a total current swing, which is made available to the cathodes 71 of the color kinescope 27, which is twice the amount of current which could be furnished by either of the pentodes 75 or 73 to the cathodes 71.

An understanding of how the pentodes 73 and 75, arranged as shown in Figure 1, supply a current swing which is twice as great as that which could be supplied by either pentode is explained in detail as follows. When the composite color television signal applied to the control grid of pentode 73 is equal to zero, and the pentodes 73 and 75 are therefore at a quiescent point, the circuit is operated so that 10 milliamperes of current pass through both the pentodes 73 and 75. However, since the currents passing through the terminal 78 to the cathodes 71, as derived from the pentode 75 and from the pentode 73, will be in opposite polarity, no net current passes from the terminal 73 to the cathodes 71. If the color television signal applied to the control grid of the pentode 73 is caused to have a positive value, the pentode 73 will deliver an increased amount of current to the terminal 78; however, a potential developed thereby across the resistor 77 will serve to decrease the amount of current applied to the terminal 78 of the pentode 75; that is, if say, the pentode 73 applies 15 milliamperes to the terminal 78 and the pentode 75 applies 5 milliamperes to the terminal 78, these currents being of opposite polarity with respect to each other, then a total of 10 milliamperes will be developed at the terminal 78 which are capable of being passed to the cathode 71. If the current of the pentode 73 is increased to say 20 milliamperes, then the increased voltage across the resistor 77 will decrease the current through the pentode 75 to virtually zero and a total of 20 milliamperes provided by only pentode 73 will be made available to the terminal point 78 and therefrom to the cathodes 71. It is to be recognized that at all times a total of 20 milliamperes has been produced by pentodes 75 and 73 in combination.

Consider now the condition where the composite color television signal applied to the pentode 73 decreases the current through that pentode to say 5 milliamperes; then the voltage across the resistor 77 will decrease and the current through the pentode 75 will increase to 15 milliamperes. Since the latter named currents are in opposite polarity with respect to each other, then 10 milliamperes of negative polarity will be provided at the terminal 88 for use in the cathode circuit of the color kinescope 27. If the color television signal applied to the control grid of pentode 73 causes the current through that pentode 73 to be reduced to zero, then a full current of 20 milliamperes having negative polarity will be delivered to the terminal 78 by the pentode 75 for use in the color kinescope 27. Thus it is evident that at any value of voltage applied to the control grid of pentode 73, the total current through pentodes 73 and 75 is maintained constant and the current to the cathodes 71 of the color kinescope 27 can only be a function of the above-named applied voltage.

The circuit coupled between the terminal 78 and the cathode 71 of the color kinescope 27, for providing the video modulated current from the composite signal driving circuit 61, includes a filter 79. The filter 79 consists of an inductance L which is coupled in series between the terminal 78 and the cathodes 71; the inductance L is shunted by a resistance R, which in the circuit which was operated, had a resistance of 22,000 ohms. Other elements of the filter 79 consist of the condenser C1 which represents the capacitance-to-ground of the cathode of the pentode 75 and also the condenser C2 which represents the capacitance between the cathodes 71 of the color kinescope 27 and ground.

The filter 79 is an impedance matching circuit which provides high impedance matching for signals in the chrominance signal frequency range so that the high impedance characteristic for the composite signal driving circuit 61 will be maintained throughout the entire frequency range of the composite signal, that is, from substantially zero to 4.2 mcs.

*Dot structure reduction*

The present invention provides for materially reducing the appearance of dot structure in a reproduced image by the color kinescope 27 by dynamically varying the demodulating signal voltages applied to the control grids of the electron guns of the color kinescope so as to provide for the minimum voltage required for all saturation conditions. The saturation of a color in the reproduced image is independent of the amplitude of the demodulating signals applied to the control grids of the electron guns provided that the demodulating signals have amplitudes at least equal to a minimum voltage amplitude which is proportional to the amplitude of the chrominance signal voltage being applied to the cathode. Demodulating signal voltages having an amplitude greater than a minimum required for a given saturation, serve no further purpose other than causing dot structure accentuation in the reproduced image (and also defocusing due to high peak kinescope currents).

The present invention provides a structure for controlling the amplitudes of the demodulating signals relative to the amplitude of the envelope of the chrominance signal to thereby materially reduce visible dot structure in the reproduced image.

A typical circuit which derives a signal proportional to the instantaneous amplitude of the envelope of the chrominance signal includes the chroma filter and amplifier 39 and the chroma envelope detector 41 of the color television receiver of Figure 1. The chroma filter and amplifier 39 is a filter circuit which has a pass band suitable for passing those frequencies in the frequency range from approximately 3.3 to 4.2 mcs. of the composite signal; the output of the chroma filter and amplifier 39 is therefore an amplified relatively narrow band chrominance signal including modulations representative of color difference signals having modulating signal frequencies up to 0.6 mc. The amplified chrominance signal or chroma is applied by way of the coil 81 to the resonant circuit 83 which has a bandwidth sufficient to develop the entire chrominance signal across its terminals 85 and 87. A rectifier 89 is connected in series with a resistance condenser network 91 between the terminals 85 and 87 of the resonant circuit 83. Terminal 87 of the resonant circuit 83 is connected to ground by way of resistor 93 and the bias source 95. The rectifier 89 and the resistance condenser network 91 function as a detector circuit which follows the envelope of the chrominance signal. The voltage developed across the resistance condenser network 91 is therefore indicative of the instantaneous value of the envelope and therefore the saturation of the chrominance signal; this voltage is applied to the control grid of the tube 37 of the gain-controlled reference signal amplifier 35. The envelope indicative voltage developed across the resistance condenser network 91 and the voltage provided by the bias source 95, provide the bias for the tube 37 in a manner which controls the gain of tube 37. Tube 37 is, preferably, a tube having remote cut-off characteristics. In order to make fine adjustments of the envelope indicative voltage possible, the resistance condenser network 91 includes a potentiometer 95′ which permits control of the amplitude of the envelope amplitude indicative signal applied to the control grid of tube 37, according to the position of the sliding contact of the potentiometer.

The envelope-amplitude indicative signal, provided by the chroma envelope detector 41, causes the gain of tube 37 to follow the envelope of the chrominance signal. The reference signal is therefore amplified in the gain controlled reference signal amplifier 35 according to a level dependent upon chroma-envelope amplitude, and applied therefrom to the phase shift circuit 45. The amplitudes of the various demodulating signals applied to the control grids of the electron guns of the color kinescope 27 by way of the demodulating signal amplifier 57, are proportioned to follow the envelope of the chrominance signal to provide the minimum demodulating signal voltage at the control electrodes of the electron guns of the color kinescope 27 for all saturation conditions.

*Color killer*

The present invention also provides for color killer action in a kinescope color processing system.

When the transmitted television signal is representative of a monochrome signal, neither the chrominance signal nor the color synchronizing bursts are transmitted. If such a signal, which is indicative of only monochrome information, is applied to a color television receiver wherein color television signal information is normally processed in the color kinescope, high frequency luminance signal information, which is applied to the color kinescope and which is processed by demodulating signals produced at random phase when the color synchronizing bursts are absent, will produce spurious color information in the reproduced image of the color kinescope 27. It is therefore highly desirable that means be provided for preventing the spurious synchronous detection of color information in a monochrome signal when the received signal is not a color television signal.

A color television receiver using a kinescope color processing system and also a demodulating signal control circuit of the present invention is uniquely adapted to also provide color killer action. By proper adjustment of the tap of the potentiometer 95′ which applies a biasing voltage to the tube 37 of the gain-controlled reference signal amplifier 35 and by producing a bias voltage from the bias source 95 which cuts off the tube 37 when no voltage is developed across the resistance-condenser network 91, a voltage is applied to the control grid of tube 37 which will reduce the gain of that tube to zero when the chroma envelope detector 41 produces an output voltage which is indicative of the absence of a chrominance signal. Thus, it is evident that the chroma envelope detector 41 and the gain-controlled reference signal amplifier 35 produces a dual function, that is, (*a*) the amplitudes of the various demodulating signals applied to the control grid of the electron guns of the color kinescope 27 are reduced in amplitude when the color saturation of the color information in a received color television signal is reduced in amplitude, and (*b*) when no chrominance signal information accompanies the received signal the amplitudes of the demodulating signals are reduced to substantially zero.

Color killer action may be augmented or provided by an auxiliary circuit which may be included in a color television receiver using the present invention. As has been mentioned above, the presence or absence of the chrominance signal is indicative of the type of transmission of a televised image. It is to be understood, of course, that the presence or absence of the color synchronizing bursts also yields an indication as to whether the picture transmission is indicative of color transmission or monochrome transmission respectively. Therefore, using a circuit shown in block diagram of Figure 3, a burst detector 100, coupled to the output of the burst separator 31 will detect the bursts when present and produce an output voltage which is indicative of either the presence or the absence of the color synchronizing bursts. The output of the burst detector 100 is thereupon coupled to the gain-controlled reference signal amplifier 35 in a manner whereby a voltage developed by the burst detector 100 during the absence of the color synchronizing bursts positively cuts off the tube 37 so that demodulating signal information is further prevented from being applied to the control grids of the electron guns of the color kinescope 27. It is to be understood by one skilled in the art that the output of the burst detector may be used to disable the color processing in the color kinescope at a point separate from the control grid of the tube 37.

Whereas the amplitude of the chrominance signal has been used as an excellent indication of the color saturation of a televised image, a more exact indication of saturation may be had by measuring the quotient of the amplitudes of the chrominance signal and the luminance signal.

Having described the invention, what is claimed is:

1. In combination: a color kinescope capable of reproducing color information at each of a plurality of component colors and having electron guns, each of said electron guns capable of producing an electron beam for controlling the light output of said color kinescope at one of said plurality of component colors, means to apply a television information signal to each of said electron guns, said television information signal including color information relating to different component colors at different phases and capable of being developed into each of a plurality of component color signals corresponding to said component colors by mixing said television information signal in an electron beam with a periodic wave having a prescribed frequency and a phase identified with a corresponding component color signal, said television information signal having a range of components whose amplitude level is indicative of color saturation, means to develop a plurality of periodic waves each having a phase identified with one of said component color signals, means responsive to said range of components in said television information signal to develop a control voltage indicative of the saturation level of color information in said television information signal, means to apply said periodic waves to the electron guns of said color kinescope, said applying means connected to said control developing means and responsive to said control voltage to control the amplitude of each of said periodic waves in accordance with said saturation.

2. In combination, a color kinescope capable of reproducing different component colors and having a plurality of electron guns, each having a cathode and a control grid and adapted to control the color light emission of one of said component colors, means to apply a color television signal including a luminance signal and a chrominance signal to each of said cathodes, said color television signal being indicative of both the component colors and the saturation of a televised image, said chrominance signal comprising a modulated subcarrier having an envelope giving an indication of saturation and having a subcarrier frequency, said color television signal capable of being converted into each of a plurality of component color signals corresponding to said component colors reproducible by said color kinescope in said color kinescope by mixing in each electron gun said color television signal and a demodulating signal having said subcarrier frequency and having a prescribed phase of said chrominance signal corresponding to color information relating to the component color light emission controlled by that electron gun, means to measure the saturation of said televised image and to develop a control voltage which varies in accordance with said saturation, means to develop a plurality of demodulating signals, each having a phase of said chrominance signal corresponding to color information in said chrominance signal related to the color light emission controllable by one of said plurality of electron guns, means coupled to said control signal developing means and to said developing demodulating signal means to control the amplitude of each of said demodulating signals in accordance with said control voltage, and means to apply each of said amplitude controlled demodulating signals to the corresponding one of said plurality of electron guns.

3. In a color television receiver adapted to receive a color television signal including color synchronizing bursts having a prescribed frequency and phase and also a luminance signal and a chrominance signal, said chrominance signal including a plurality of color difference signals occurring at different phases as referred to the phases of said bursts, said color television signal capable of being converted in the electron gun of a kinescope to one of a plurality of component colors capable of being reproduced by said color kinescope by mixing said color television signal with a demodulating signal having the frequency of said bursts and a phase related to corresponding color information in said chrominance signal in an electron gun of said color kinescope, the combination of: a color kinescope having a plurality of electron guns, each of said electron guns having control electrodes and having a target area whereon electron beams from each of said electron guns impinge to develop color light emission corresponding to each of said component colors, a high impedance amplifier circuit coupled to a selected electrode of each of said plurality of electron guns and responsive to said color television signal to apply said color television signal to said selected control electrodes, a chrominance signal separating circuit for separating said chrominance signal from said color television signal, a chrominance signal envelope detector coupled to said chrominance signal separation circuit and responsive to the envelope of said chrominance signal for developing a control voltage which is indicative of the envelope of said chrominance signal, a signal developing circuit responsive to said bursts for developing a reference signal having a frequency and phase prescribed by said bursts, means coupled to said signal developing means and to said chrominance signal envelope detector to develop an amplitude controlled reference signal whose amplitude varies in accordance with said control signal, means to derive from said amplitude controlled signal a plurality of demodulating signals, each having a phase related to a phase of said chrominance signal wherein occurs color information corresponding to a component color to be reproduced by said color kinescope, said demodulating signals thereby caused to vary in accordance with the variations of said amplitude controlled reference signal, and means to apply said color television signal and the corresponding one of said demodulating signals to the control electrodes of each of the electron guns of said color kinescope wherein the mixing of said color television signal and the applied demodulating signal produces a corresponding component color signal in the electron beam issuing from that electron gun.

4. In a color kinescope color-processing circuit, a circuit for minimizing objectionable dot structure in images reproduced by said color kinescope comprising in combination: a color kinescope having a plurality of electron guns each having a group of control electrodes, each electron gun capable of projecting an electron beam to a target area for producing light emission at a corresponding color, a circuit to provide a color television signal including a chrominance signal and also color synchronizing bursts, said chrominance signal comprising a modulated subcarrier having an envelope and having a subcarrier frequency, said bursts having said subcarrier frequency and having a reference phase to which the phases of said chrominance signal are related, said color television signal being capable of being converted into a prescribed component color signal in each electron gun of said color kinescope by mixing therein said color television signal and a demodulating signal having said subcarrier frequency and having a prescribed phase of said chrominance signal wherein occurs color information related to the component color signal to be produced in that electron gun, means to detect the envelope of said chrominance signal and to develop therefrom a control voltage which varies in accordance with said envelope, a signal developing means synchronized by said color synchronizing bursts to develop a plurality of demodulating signals each having a phase of said chrominance signals at which occurs a corresponding component color information signal which can be reproduced by said color kinescope, said demodulating signal developing means including means coupled to said chrominance signal detecting means and responsive to said control voltage to vary the amplitude of each of said demodulating signals according to a prescribed relationship with respect to the envelope of said chrominance signal, means coupled to said color television signal providing circuit to apply a current representative of said color television signal to each of said electron guns, said color television signal applying means including means to prevent the signal mixing in said electron gun from influencing the magnitude of said current applied thereto by said color television signal applying means, means coupled to said demodulating signal developing means to apply each of said amplitude modulated signals to a control electrode of a corresponding one of said plurality of electron guns of said color kinescope whereby in regions of high saturation of an image represented by said color television signal the amplitude of the demodulating signals is reduced to thereupon minimize objectionable dot structure ordinarily reproducible by said color kinescope when said demodulating signals are not correspondingly reduced in amplitude.

5. In combination, a color kinescope having at least an electron gun for controlling the color light output at a component color, a circuit to provide a chrominance signal comprising a modulated subcarrier and having an envelope, said chrominance signal having a subcarrier frequency and representative of color information relating to said component color at predetermined phase of said chrominance signal, said color information signal being capable of being demodulated from said chrominance signal by the mixing of said chrominance signal with a demodulating signal having said phase of said chrominance signal in said electron gun, means to develop a demodulating signal having said predetermined phase, means coupled to said chrominance signal providing circuit to develop a control signal which varies in accordance with the instantaneous value of the envelope of said chrominance signal, means coupled to said control signal developing means and to said demodulating signal developing means to control the amplitude of said demodulating signal in accordance with said instantaneous amplitude of said envelope, and means to apply said chrominance signal and said amplitude controlled demodulating signal to said electron gun of said color kinescope.

6. In combination, a circuit to provide a color television signal including a luminance signal and a chrominance signal, said chrominance signal comprising a modulated subcarrier having an envelope and having a subcarrier frequency, said color television signal being capable of being converted into a signal representing information relating to a component color of a televised image by electrically mixing said color television signal and a demodulating signal having said subcarrier frequency and having a phase corresponding to a phase of said chrominance signal wherein said color information relating to said component color occurs, means to develop a demodulating signal having said last-named phase, means coupled to said color television signal providing circuit to develop a control voltage which varies in accordance with the envelope of said chrominance signal, means connected to said control signal developing means and coupled to said demodulating signal developing means for controlling the amplitude of said demodulating signal in accordance with the amplitude of the envelope of said chrominance signal, and electrical mixing means coupled to both said color television signal providing circuit and to said demodulating signal amplitude-controlling means for electrically mixing said color television signal and said amplitude controlled demodulating signal.

7. In combination, a circuit to provide a chrominance signal, said chrominance signal comprising a modulated subcarrier having an envelope and having a subcarrier frequency, said chrominance signal being capable of being demodulated to provide signal representing information relating to a component color of a televised image by electrically mixing said chrominance signal and a demodulating signal having said subcarrier frequency and having a phase corresponding to a phase of said chrominance signal wherein color information relating to said component color occurs, means to develop a demodulating signal having said last-named phase, means coupled to said color television signal providing circuit to develop a control voltage which varies in accordance with the envelope of said chrominance signal, means connected to said control signal developing means and coupled to said demodulating signal developing means for controlling the amplitude of said demodulating signal in accordance with the amplitude of the envelope of said chrominance signal, and electrical mixing means coupled to both said chrominance signal providing circuit and to said demodulating signal amplitude-controlling means for mixing said color television signal and said amplitude controlled demodulating signal.

8. In combination, a color kinescope having at least an electron gun having a cathode and a control grid, means to apply a color television signal including a luminance signal and a chrominance signal to said cathode, said chrominance signal comprising a modulated subcarrier having an envelope and having a subcarrier frequency, said color television signal being capable of being converted into a component color signal in said color kinescope by mixing said color television signal and a demodulating signal having said subcarrier frequency and having a prescribed phase of said chrominance signal in said electron gun, means to detect the envelope of said chrominance signal to develop a control voltage which varies in accordance with said envelope, means to develop a demodulating signal having said prescribed phase, means coupled to said detecting means and to said developing means to control the amplitude of said demodulating signal in accordance with said control voltage, and means to apply said amplitude-controlled demodulating signal to said control grid.

References Cited in the file of this patent

UNITED STATES PATENTS

| | | |
|---|---|---|
| 2,742,522 | Law | Apr. 17, 1956 |
| 2,790,846 | Keizer | Apr. 30, 1957 |

OTHER REFERENCES

Introduction to Color TV, Kaufman and Thomas. Copyright 1954 by John F. Rider Publishers, Inc., TK6670K3, in Scientific Library, GE receiver facing inside back cover.